April 4, 1939.  I. L. WILCOX  2,152,941
MACHINE FOR FORMING LINER BAGS FOR CONTAINERS
Filed Oct. 13, 1936  9 Sheets-Sheet 1

INVENTOR:
Isaac L. Wilcox,
BY Bodell & Thompson
ATTORNEYS.

April 4, 1939.  I. L. WILCOX  2,152,941
MACHINE FOR FORMING LINER BAGS FOR CONTAINERS
Filed Oct. 13, 1936   9 Sheets-Sheet 2

INVENTOR:
Isaac L. Wilcox,
BY Bodell & Thompson
ATTORNEYS.

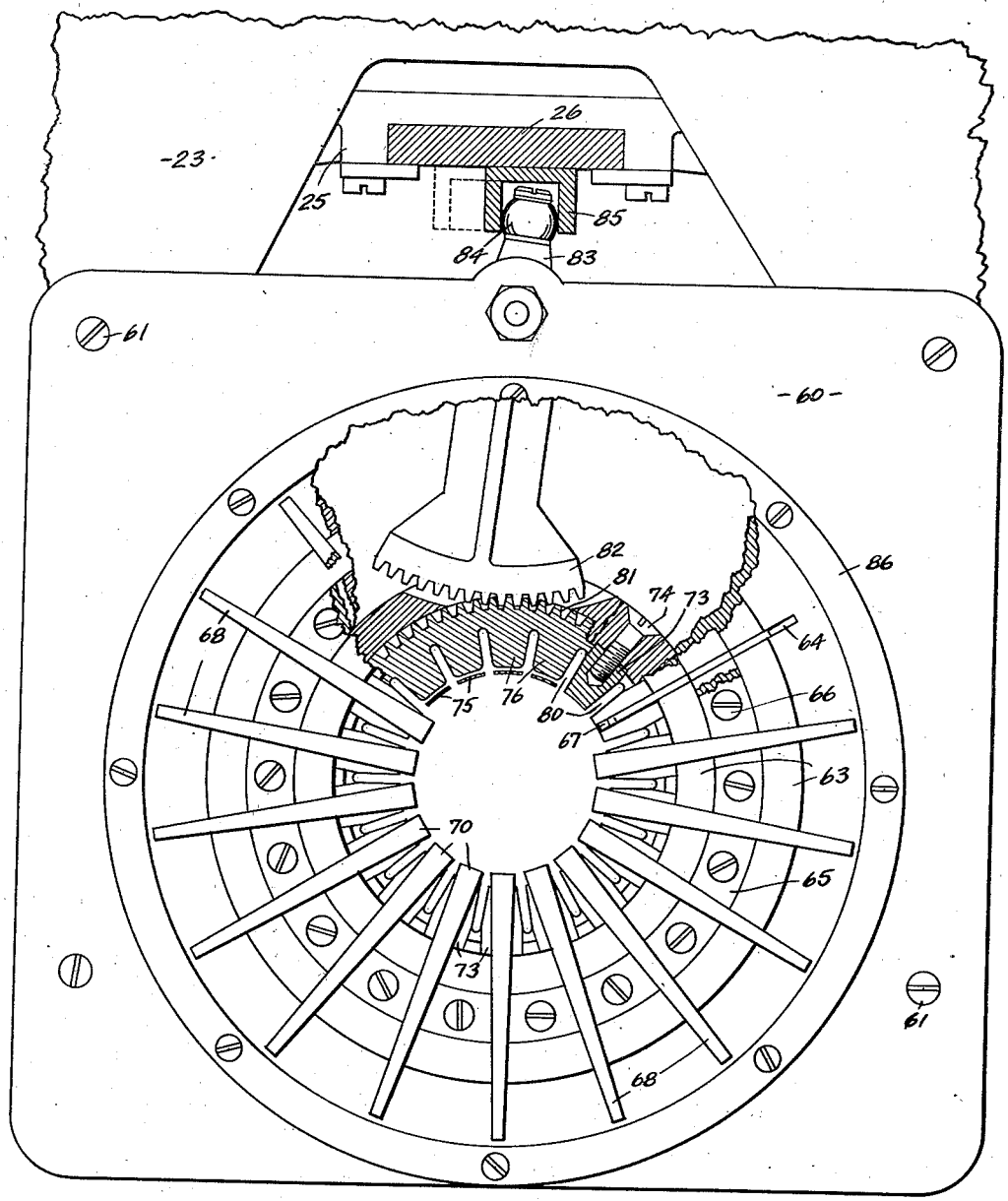

April 4, 1939.  I. L. WILCOX  2,152,941
MACHINE FOR FORMING LINER BAGS FOR CONTAINERS
Filed Oct. 13, 1936  9 Sheets-Sheet 4
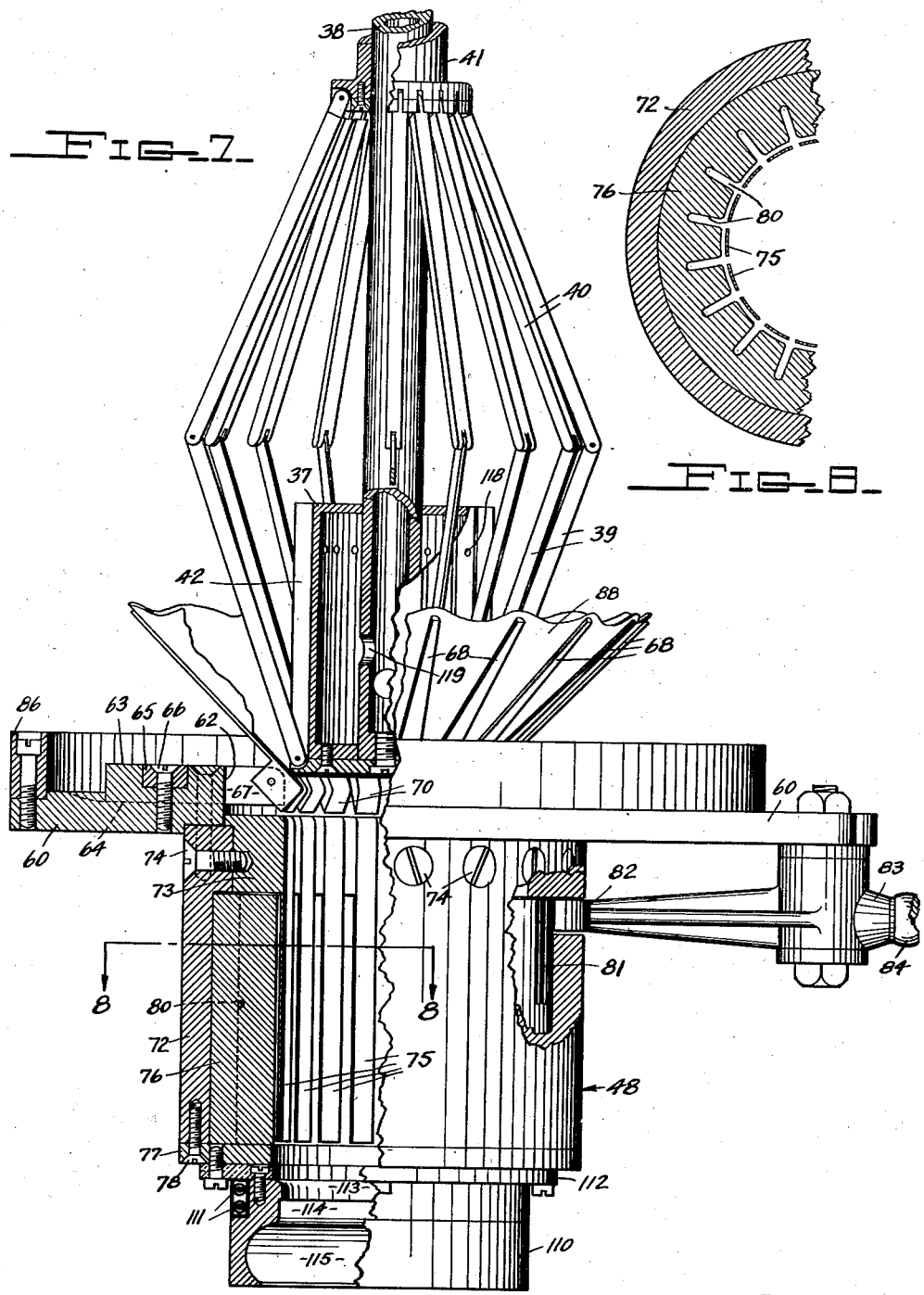
INVENTOR:
Isaac L. Wilcox,
BY Bodell & Thompson
ATTORNEYS.

April 4, 1939.  I. L. WILCOX  2,152,941
MACHINE FOR FORMING LINER BAGS FOR CONTAINERS
Filed Oct. 13, 1936  9 Sheets-Sheet 5
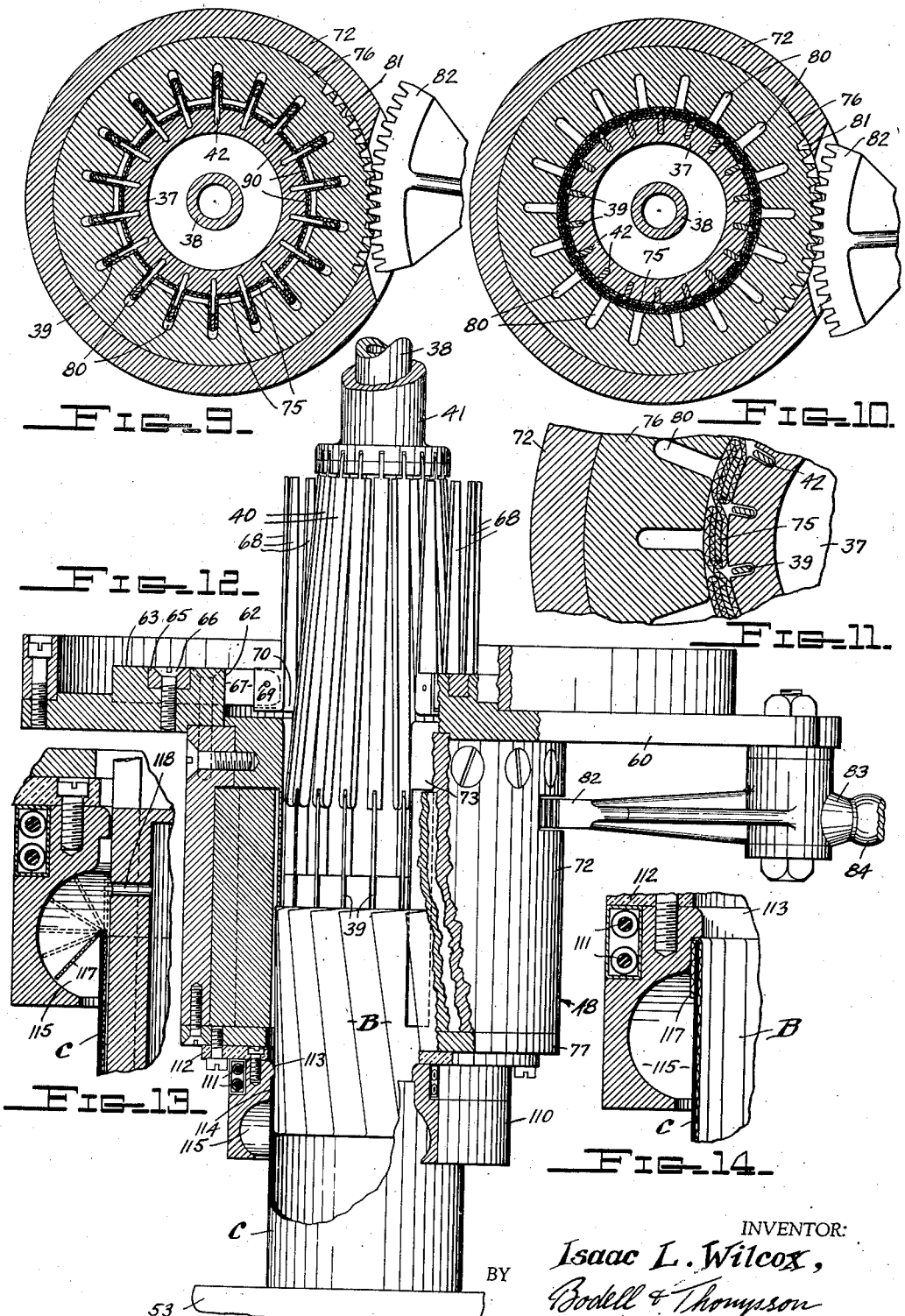
INVENTOR:
Isaac L. Wilcox,
BY Bodell & Thompson
ATTORNEYS.

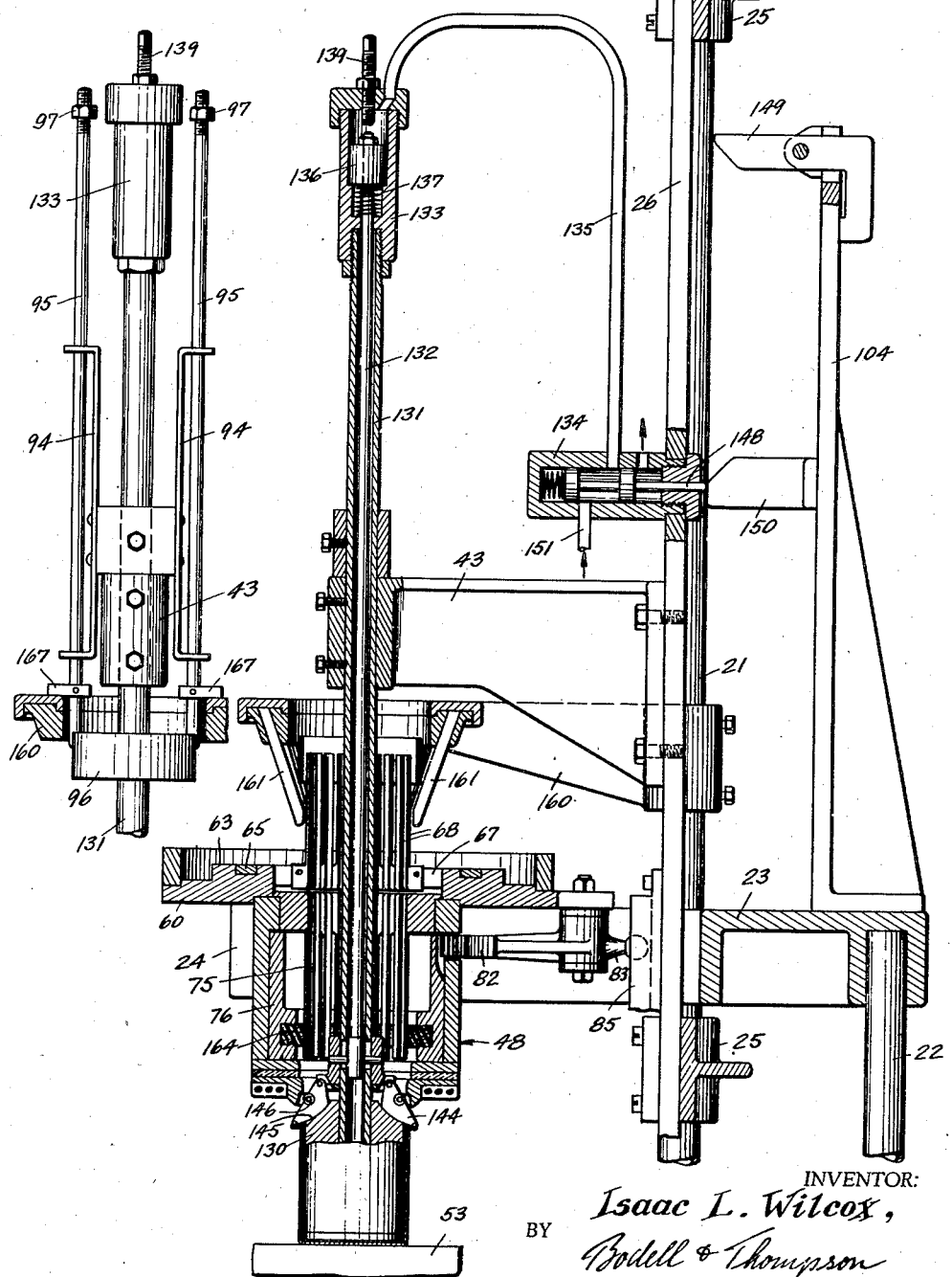

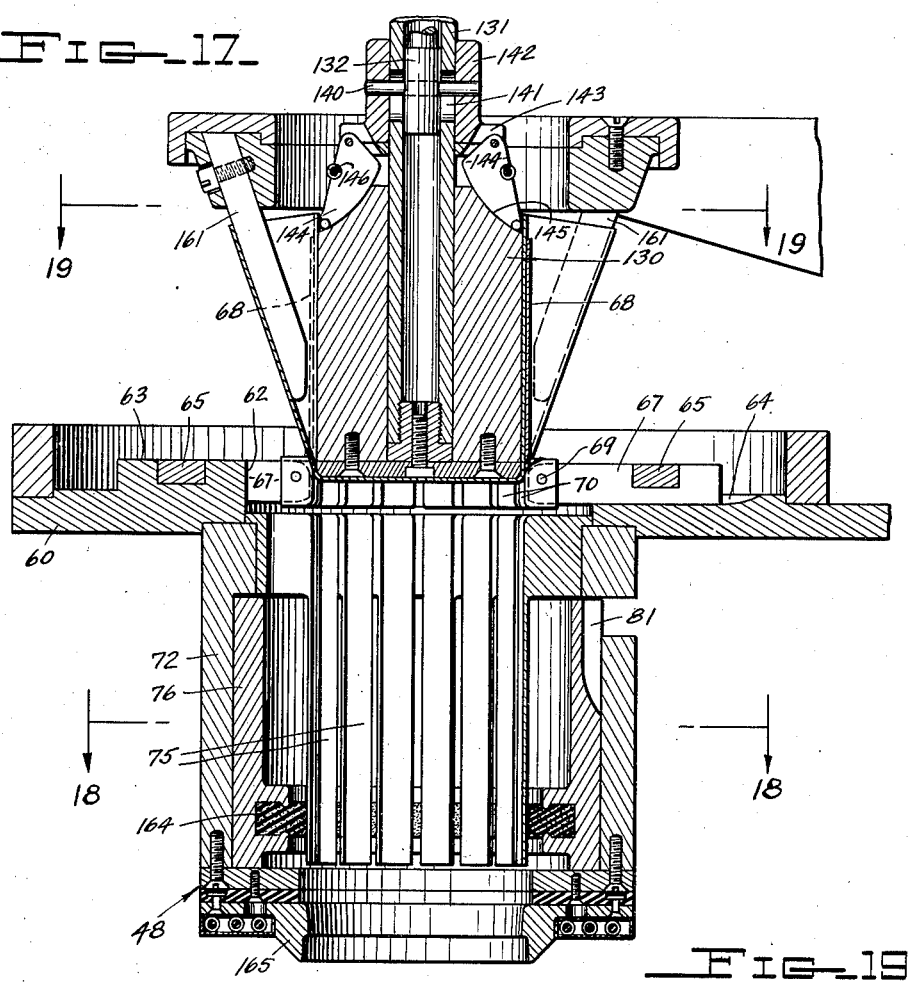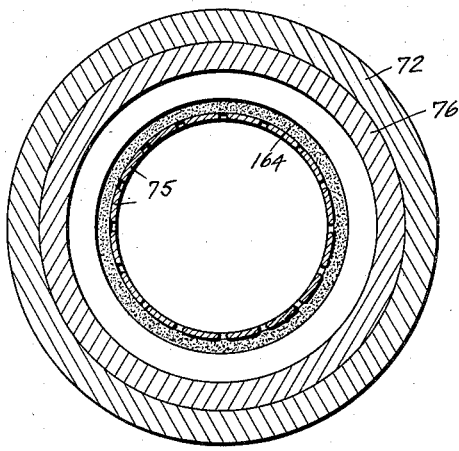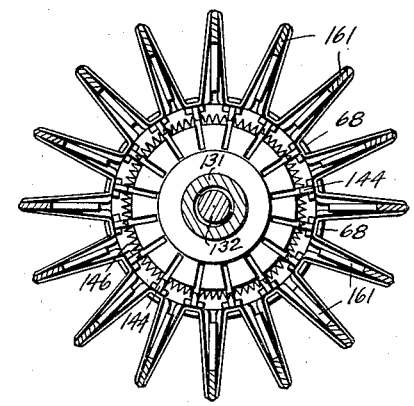

April 4, 1939.  I. L. WILCOX  2,152,941
MACHINE FOR FORMING LINER BAGS FOR CONTAINERS
Filed Oct. 13, 1936  9 Sheets-Sheet 8
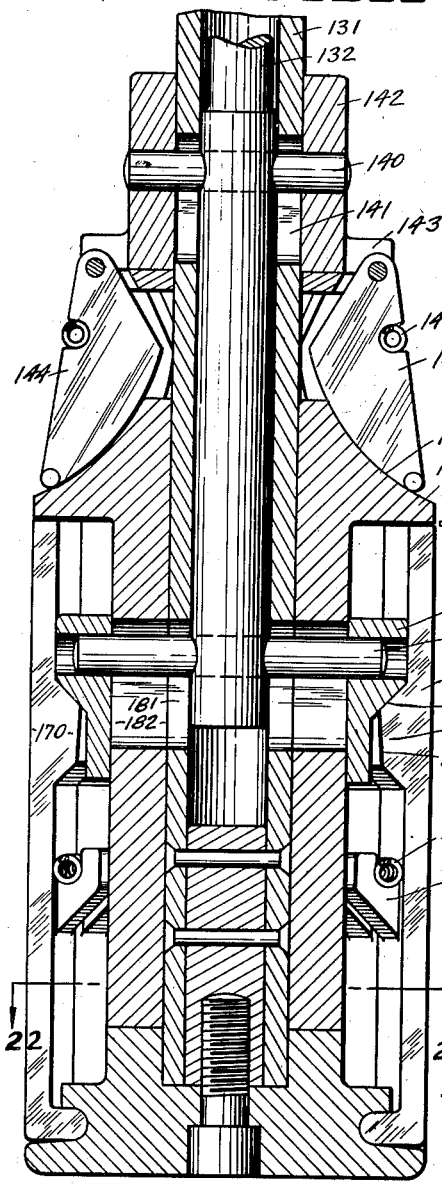
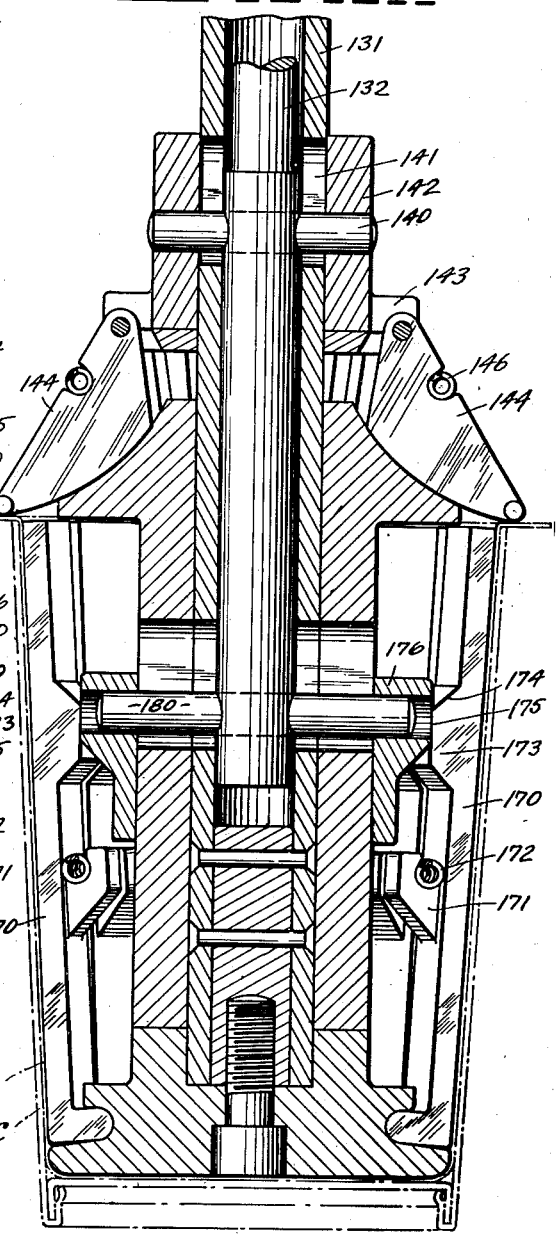
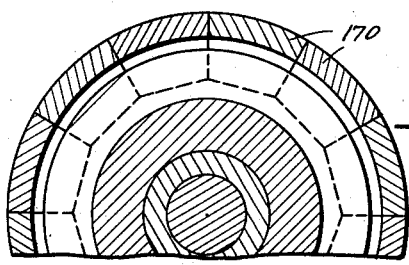
INVENTOR:
Isaac L. Wilcox,
BY Bodell & Thompson
ATTORNEYS.

Patented Apr. 4, 1939

2,152,941

UNITED STATES PATENT OFFICE 2,152,941

MACHINE FOR FORMING LINER BAGS FOR CONTAINERS

Isaac L. Wilcox, Fulton, N. Y., assignor to Oswego Falls Corporation, Fulton, N. Y., a corporation of New York Application October 13, 1936, Serial No. 105,411

40 Claims. (Cl. 93—60)

This invention has to do with a machine for forming a bag from a disk or blank of thin, flexible material, such as "Cellophane", which bag is subsequently inserted in a container usually formed of paper board, or other fibrous material, the bag acting as a moisture proof and/or gas tight liner for the container.

My invention further includes a machine incorporating means whereby the bag, immediately upon formation, is automatically inserted in the container and secured thereto.

While containers formed of paper and like fibrous materials are more economical than those formed of glass or metal they are nevertheless unsuited for use with certain products, due to the fact that they are not liquid tight, or will not remain liquid tight any appreciable length of time, and are not gas tight. There are now available on the market certain kinds of thin, flexible materials which are liquid and greaseproof, and which do not permit the passage of gases. An example of such material is "Cellophane", and it has been found that when paper containers are provided with a liner or liner bag formed of these materials, the container is comparable with those made of other materials, such as glass and metal, but are much cheaper in cost. There has been however, an appreciable problem present in forming the sheet material into a liner bag and inserting the same in the container. This is due essentially to the inherent characteristics of the sheet material, and because of these characteristics the material can not be handled in the same manner as paper.

The general object of my invention is a machine which will quickly and economically form the sheet material into a liner bag and preferably simultaneously insert the bag in the container and which machine, because of its novel arrangement and construction, will operate at sufficiently high speed comparable with the manufacture of the paper containers with facilities now available.

The invention consists in the novel features and in the combinations and constructions hereinafter set forth and claimed.

In describing this invention, reference is had to the accompanying drawings in which like characters designate corresponding parts in all the views.

Figure 6 is an enlarged, plan view of the forming die partially in section, taken on lines 6—6, Figure 2.

Figure 7 is a side elevational view of the forming die and ram, each being partially in section.

Figure 8 is a fragmentary, sectional view taken on lines 8—8, Figure 7.

Figure 9 is a cross sectional view, taken through the forming die and ram shown in Figure 7, with the ram partially entered in the forming die.

Figure 10 is a view, similar to Figure 9, with the ram completely entered in the forming die and the preliminary folds arranged in pleat formation.

Figure 11 is an enlarged, fragmentary, detail of the structure shown in Figure 10, to better illustrate the pleating action.

Figure 12 is a view, similar to Figure 7, with the ram having partially passed through the forming die, the liner bag completely formed and partially inserted in the container.

Figure 13 is a fragmentary, sectional, detail view of the structure shown in the lower left portion of Figure 12 illustrating the bag completely inserted in the container, and the container moved downwardly with the extending open end of the bag being folded over the top edge of the container.

Figure 14 is a view, similar to Figure 13, showing the container subsequently elevated into initial position with the folded portion of the bag being ironed against the periphery of the container.

Figure 15 is a vertical, sectional view, with parts in elevation, illustrating a modified form of ram and forming die.

Figure 16 is a front elevation of parts shown in Figure 15.

Figure 17 is a vertical, sectional view taken through the ram and forming die illustrated in Figure 15, showing the ram about to enter the die.

Figure 18 is a sectional view taken on lines 18—18, Figure 17.

Figure 19 is a sectional view taken on lines 19—19, Figure 17.

Figure 20 is a vertical, sectional view taken through a modified form of ram having an expansible side wall.

Figure 21 is a view, similar to Figure 20, illustrating the arrangement of parts when the side wall of the ram is expanded.

Figure 22 is a partial, cross sectional view taken on lines 22—22, Figure 20.

Figures 1, 2:
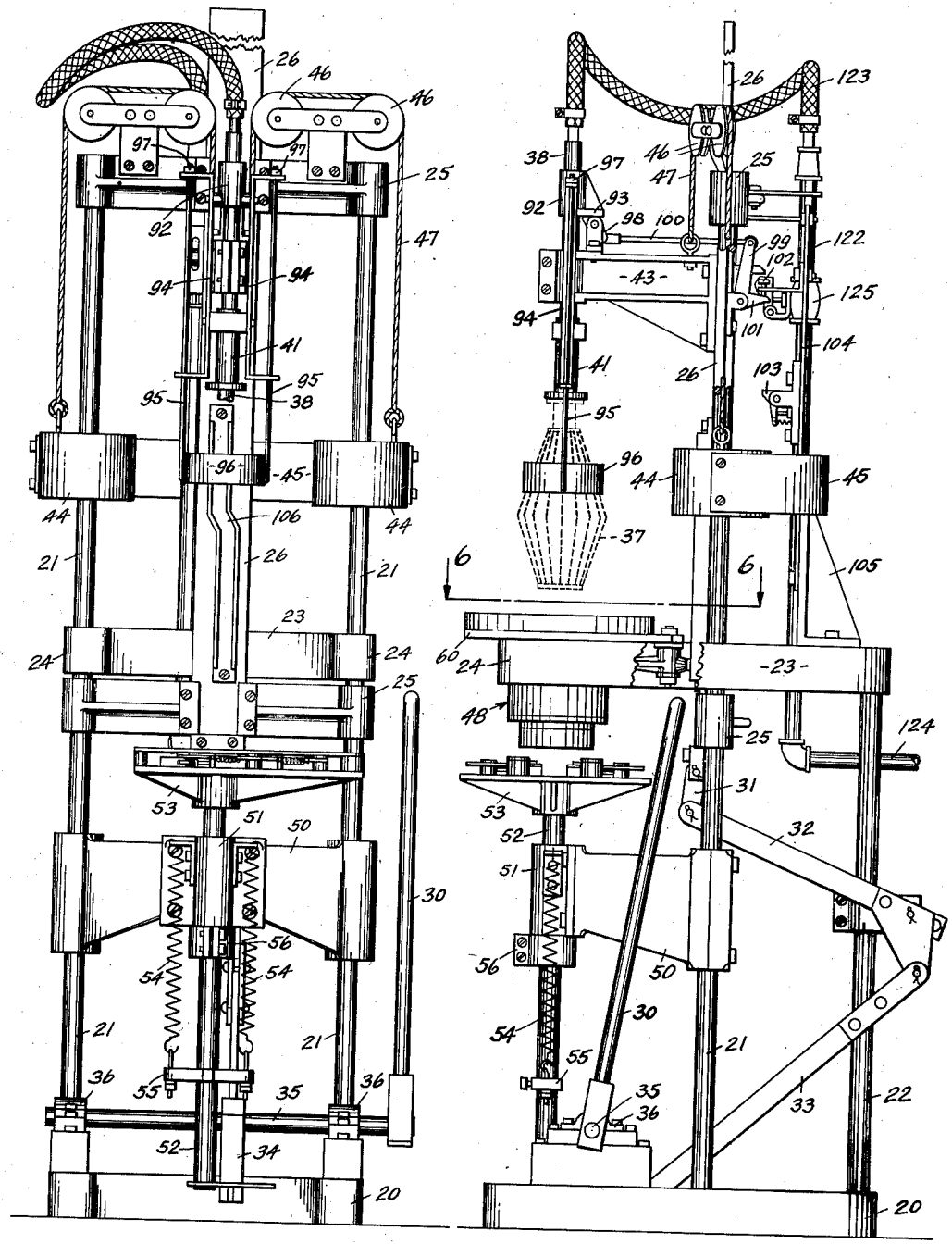
Figure 1 is a front elevational view, with parts removed, showing the present embodiment of my invention.
Figure 2 is a side elevational view of the structure shown in Figure 1, with a portion of the frame broken away, showing part of the die actuating mechanism.

The invention comprises generally a suitable frame, a support carried by the frame and provided with an aperture extending therethrough, a ram slidably mounted in the frame and movable into and out of said aperture to draw the blank of sheet material therethrough and arrange the same in bag formation, a plurality of folding fingers movably mounted upon the upper side of said support and extending radially from said aperture in a horizontal position to support the blank, and being movable as the ram descends towards and enters the aperture, and means cooperable with said fingers during such movement to form the side of the bag with radially extending folds, cooperating members arranged below or on the other side of said support, and arranged to receive the folded bag formation and being cooperable to form said radial folds into circumferentially extending pleats.

The machine shown further includes a container support arranged beneath the pleating mechanism and adapted to position the container so as to receive the pleated bag, and means for folding over the open end of the bag and securing the same to the upper edge of the container.

My invention is here shown as embodied in a manually operable machine. However, as the description proceeds, it will be apparent to those skilled in the art that the invention can be embodied in a power operated, fully automatic machine.

The frame of the machine here shown comprises a base 20, from the top surface of which extend a pair of spaced apart rods 21 being of appreciable length and extending to the top of the machine. A third rod 22 extends upwardly from the rear portion of the base. A support 23 is carried by the rods 21, 22. The support 23 is formed with forwardly extending sides 24 providing a recess in which the bag forming and pleating mechanisms are mounted. The side rods 21 extend upwardly through the support 23, and a pair of spaced apart cross pieces 25 are secured to the rods 21, one of said cross pieces being secured at the top of the rods, and the other immediately below the support 23. The central portion of the cross members 25 is constructed to form a bearing to slidably receive a bar 26, rectangular in cross section, and to which the ram or forming head is connected. The lower end of the bar 26 is connected to the operating manual 30 by means of links 31, 32, 33, 34. The manual 30 is secured to one end of a rock shaft 35 mounted in bearings 36 on each side of the base 20, and one end of the link 34 is secured to the shaft 35 intermediate the bearings 36. The linkage is such that when the manual 30 is moved forwardly and rearwardly, the bar 26 is reciprocated vertically in the cross members 25.

As shown in Figures 1 to 4, 7 and 12, the general construction of the ram 37 is of the so-called umbrella type. That is, the ram comprises a cylindrical portion secured to a stem 38. A series of blades or folding fingers 39 are pivoted at their lower ends to the cylindrical portion of the ram, and a series of like blades 40 are pivoted at their upper ends to a collar 41 slidably mounted upon stem 38, and the links 39, 40, are pivotally joined at their free ends, whereby the blades 39 are permitted to move toward and from the cylindrical portion of the ram in an arcuate movement, and the side of the cylindrical portion is formed with a plurality of axially extending slots 42 to receive the blades 39 when they are moved to vertical position.

As shown in the figures above referred to, the stem 38 is of tubular construction and is rigidly secured in the outer end of a bracket 43 which is rigidly secured to, and carried by, the sliding bar 26. In the machine shown, counterweights 44 may be employed to counterbalance the bar 26, bracket 43, ram 37, and other movable parts associated with the bar 26. As here shown, Figures 1 and 2, the weights 44 are slidably mounted upon the rods 21 of the frame and are connected together by a band 45 to prevent rotary movement, and a pair of spaced apart pulleys 46 are secured to the upper cross member 25 and over which a rope or cable 47 operates with one end thereof secured to the bracket 43, and the opposite ends to the weights 44.

The blank of sheet material is operated upon successively by two mechanisms. The first mechanism arranges the flat blank into bag formation with the side wall of the bag formed with radially extending folds which taper upwardly and outwardly, and the second mechanism is operable to form said radial folds into uniform circumferentially extending pleats. As here shown, both the forming and pleating mechanisms are carried by the support 23, although it will be apparent, as the description proceeds, that each of these mechanisms may be carried by a separate support. The blank and bag formation are carried through the folding and pleating mechanisms, and are inserted in the container positioned on a support below said mechanisms upon downward movement of the ram.

A bracket 50 is secured to the rods 21, and the central portion of the bracket extends forwardly and is provided with a vertically arranged bearing 51 to slidably receive the shaft 52, to the upper end of which is secured a table 53 which serves as a support for the containers, and on the upper surface of which is mounted mechanism of any suitable construction for releasably holding the container in axial alinement with the forming and pleating mechanisms. The rod 52 and the table 53 are urged upwardly by tension springs 54, the upper ends of which are secured to the bracket 50, and the lower ends to an adjustable cross member 55 secured to the shaft 52, and the upward movement of the shaft and table is defined by an adjustable collar 56 coacting with the bottom of the bearing 51. The adjustment of the collar 56 is such that the top edge of the container enters the lower end of the pleating mechanism, or an annular member carried thereby. As the ram 37 passes through the forming and pleating mechanisms and inserts the formed bag in the container, the table 53 and the container are moved downwardly spacing the top edge of the container a slight distance below the bottom of the pleating mechanism. The purpose of this construction will be hereinafter explained.

The forming mechanism comprises, in part, a rectangular top plate 60, which may be integral with or secured to the support 23 by screws 61, and is provided with a centrally arranged aperture 62 surrounded by an upwardly extending annular surface 63. The annular rib or surface 63 is formed with a plurality of slots 64 extending radially from the central aperture 62, and the top surface of the rib 63 is provided with an annular recess to receive clamping ring 65 which is secured to the plate 60, as by screws 66. A folding finger mount or support 67 is mounted in each of the radially extending slots 64, and the upper edge of the finger support 67 is provided with a rectangular recess to receive the clamping ring 65. The folding fingers 68 are pivotally secured at their lower ends to the inner ends of the support 67, as at 69, with the inner or lower ends 70 of the fingers 68 projecting inwardly a slight distance in the path of the movable ram 37. Normally, the fingers 68 lie in a horizontal position resting upon the annular surface 63 and the clamping ring 65, the top surface of which is arranged flush with the top surface of the annular rib 63, as illustrated in Figure 6. Accordingly, as the ram 37 descends and contacts the inner ends 70 of the fingers 68, the outer ends of the fingers travel in an arcuate path toward the axis of the ram until they assume a vertical position substantially parallel with the periphery of the ram. Pivotal movement may be imparted to the fingers 68 by any suitable motion transmitting means, the operation of which is timed with the movement of the ram 37, rather than have such movement imparted by the ram coacting with the inner ends of the fingers. During the pivotal movement of the fingers 68, they cooperate with the fingers 39, Figures 1 to 12, to form the marginal portion of the blank into radially extending folds.

The pleating mechanism includes a depending cylindrical portion 72 here shown as being secured to the under side of the plate or support 60, and in the upper end of which is secured an annular series of blocks 73, as by screws 74. Each block 73 is formed with a depending blade or finger 75. The series of fingers 75 is arranged in axial alinement with the fingers 68, as illustrated in Figures 6 and 7.

As shown in Figures 6 to 12, a sleeve 76 is rotatably mounted in the casing 72 and is held therein by an annular end plate 77 attached to the lower end of the casing 72, as by screws 78. The sleeve 76 is formed with a plurality of axially extending slots 80 arranged radially. The sleeve is initially positioned so as to arrange the slots 80 intermediate the fingers 68, 75. The rear peripheral portion of the sleeve 76 is formed with gear teeth 81, and a gear quadrant 82 is pivoted to the under side of the plate 60 to the rear of the die structure, and is provided with a rearwardly extending stem 83 provided with a spherical end portion 84 which is positioned in the cam slot 85 formed on the forward face of bar 26. The cam slot 85 is so formed as to effect oscillation of the quadrant 82 when the ram 37 has substantially reached the bottom of the aperture of the die structure. The top surface of the plate 60 is provided with an annular ring 86 for positioning a circular blank on top of the fingers 68 when in horizontal position.

The ram 37 is so arranged as to position the fingers 39 intermediate the fingers 68, 75. The purpose of the fingers 39, 68 is to preliminarily form the marginal portion of the blank into folds. As the ram 37 descends on the blank and exerts pressure on the inner end 70 of the fingers 68, the outer ends of the fingers 68 move upwardly in an arcuate path and raise with them the marginal portion 88 of the blank. At this time, the fingers 39, 40, are in angular relationship. That is, the fingers 39 extend upwardly and outwardly from the base of the ram, and inasmuch as they are arranged intermediate the fingers 68, the marginal portion 88 of the blank is formed into wave-like folds as the fingers 68 pass between the fingers 39. As the ram descends in the aperture of the plate 60 and through fingers 75, the folds 89 are positioned in the slots 80 of sleeve 76 by the fingers 39, as indicated in Figure 9, and the intermediate portion 90 of the blank, intermediate the folds 89, is arranged between the periphery of the ram and the fingers 75. During this downward movement of the ram through the aperture, the fingers 39, 40 are maintained in out position. It will be observed that the sleeve 76 can not now be rotated, due to the fact that the fingers 39 are arranged in the slots 80. Means is provided for positively collapsing the fingers 39 and 40 when the ram has entered the pleating mechanism a substantial distance.

As previously explained, the upper ends of the fingers 40 are pivoted to a collar 41 slidable upon the tubular stem 38 of the ram. The collar 41 is connected to an upper collar 92 also slidably mounted upon the stem 38, and being provided with a rearwardly projecting extension 93. The collars 41, 92 are connected by side members 94, the ends of which are bent outwardly to act as a guide and support for rods 95, to the lower end of which is secured a band 96.

The rods 95 are slidably mounted in the side members 94, and the upper ends of the rods are provided with collars or stops 97, and the rods are of such length as to normally locate the band 96 in a position to encircle the upper portion of the ram. The function of the band 96 is to retain the fingers 68 in vertical position while the ram is descending in the aperture of the die 48, and maintain them in such vertical position until after the top end of the ram has been withdrawn from the aperture in order to prevent the inner ends of the fingers 68 from being contacted by the top of the ram on its return stroke, and thereby causing possible damage to the fingers and supporting structure.

In the machine constructed in accordance with Figures 1 and 2, the band 96 descends with the ram passing over or encircling the fingers 68 which are moved into vertical position by the descent of the ram, and the band 96 continues its downward movement with the ram until it contacts the top face of the die. Thereafter, the ram, together with the side members 94, moves downwardly during the remainder of the downward stroke, with the ends of the side members 94 sliding on the rods 95. With the band 96 in this position, the fingers 68 are prevented from accidentally falling to horizontal position, but rather are maintained in vertical position until after the ram is well out of the aperture of the die.

It will be observed that sliding movement of the collars 41, 92, relative to the stem 38, will effect expansion and contraction of the fingers 39, 40. A cam 98 is pivotally mounted on the top surface of bracket 48 and coacts at its upper end with the rearwardly extending projection 93, and is connected at its opposite end to an angle lever 99, as by tie rod 100. The rearwardly projecting arm 101, of lever 99, is arranged to coact with an adjustable upper stop 102, and a lower stop 103. The stops 102, 103, are arranged on a vertical support 104 carried by bracket 105, see Figure 3, secured to the rear top surface of support 23. When the bracket 43 and ram reaches the top of the stroke, arm 101 of lever 99 coacts with the adjustable stop 102, causing the tie rod 100 to move rearwardly actuating the cam in a counter-clockwise direction, and permitting the upper collar 92 to move downwardly toward the bracket 43. This permits the fingers 39, 40 to expand, as shown in dotted outline, Figure 2.

Figure 3:
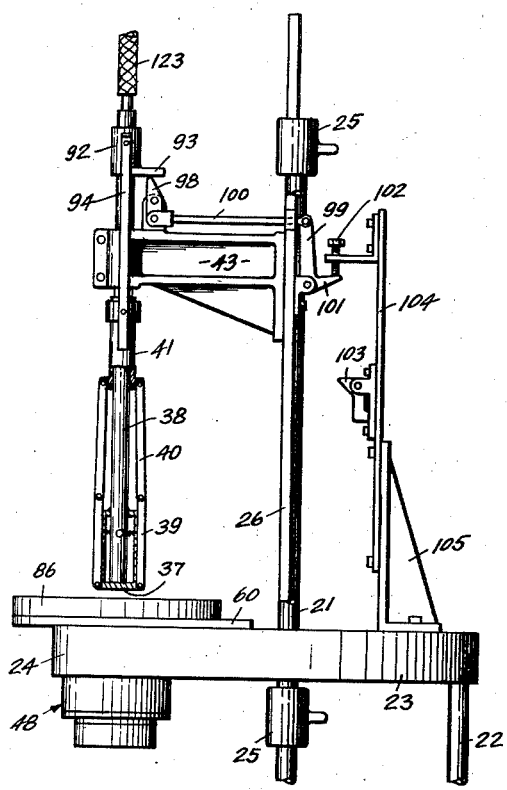
Figure 3 is a side elevational view of the upper portion of the machine, with parts being omitted to more clearly illustrate actuating mechanism for the ram, or forming head.

In Figure 3, the lever 99 has just contacted the adjustable stop 102, and in Figure 2 the ram has moved to the top of its stroke and the cam operated to permit the fingers to assume expanded position. As the ram descends, arm 101 of lever 99 coacts with the lower stop 103. This stop is pivotally mounted to the support 104 and has movement only in a clockwise direction. Accordingly, the lever 99 is moved in a counter-clockwise direction. That is, the tie rod 100 is moved forwardly actuating the same in a counter-clockwise direction to elevate the collars 41, 92, effecting a collapse of the fingers, as illustrated in Figure 3. In this position, the fingers 39 have been moved into the slots 42 of the ram and out of the slots 80 of sleeve 76. The fingers remain in this position until the ram has been elevated to the top of its stroke, as previously described.

The offset 106 in cam track 85 is so arranged relatively as to effect rotation of the sleeve 76 immediately after the fingers 39 have been collapsed. Inasmuch as the intermediate portion 90 of the blank is arranged between the fingers 75 and the periphery of the ram, or in other words, in view of the fact that the folds 89 are held at their base by the fingers 75, rotation of the sleeve 76 causes the folds 89 to move to a circumferentially extending position. That is, the preliminary folds 89 are formed into pleats tapering from the bottom, of the now formed bag, upwardly. The relative position of the fingers 39, sleeve 76 and associated parts, previous to the collapse of the fingers 39, is shown in Figure 9, and Figure 10 illustrates the relative position of these elements after the fingers 39 have been collapsed or moved from the slots 80, and the sleeve 76 rotated. It will be understood that it is only necessary to rotate the sleeve 76 circumferentially a distance equal to the space intermediate the slots 80. The folds in their pleated form are illustrated in the enlarged fragmentary detail of Figure 11.

The flat blank of sheet material has now been formed into a bag having a pleated side wall by the mechanism and operations above described. This bag is intended as a liner for a container, and preferably the machine includes means whereby the bag can be immediately inserted in the container and the upper or open end of the bag folded over the top edge of the container.

Referring to Figures 12, 13 and 14, an annular member 110 is detachably secured to the bottom flange 77. The annular member 110 is preferably heated as by electric coils 111, in which event the annular member is secured to a heat insulating ring 112 which, in turn, is secured to the end plate 77. The bore of the annular member 110, at its upper end, is rounded or chamfered slightly as at 113, and immediately below is provided with a straight cylindrical bore 114 to receive the upper end of the container C. The lower portion of the annular member 110 is formed with an internal recess 115.

The container C is supported by the table 53 with the top edge of the container in the cylindrical upper bore 114, and as the ram descends through the aperture of the die 48, the pleated bag B is carried downwardly by the ram and inserted into the container C.

Upon continued downward movement of the ram, the container C and its support 53 are pressed downwardly to substantially the position shown in Figure 13, that is, with the top edge of the container positioned approximately in the center of the recess 115.

The blank, from which the bag B is formed, is of such diameter as to make the side wall of the bag slightly longer than the depth of the container C, whereby the top portion of the bag 117 extends beyond the top edge of the container. Means is provided for folding this extending portion 117 of the bag over the top edge of the container to which adhesive may be previously applied. Referring to Figures 7, 12, 13 and 14, the body of the ram is in the form of a closed cylinder and provided near the top with a plurality of holes 118 extending through the side wall of the ram, and the tubular stem 38 is provided with one or more openings 119, whereby fluid, such as compressed air, may be forced through the stem 38 and out through the apertures 118. The holes 118 are arranged intermediate the fingers 39 and serve the dual purpose of folding the top portion 117 of the bag over the top of the container, and also returning the folding fingers 68 to their initial horizontal position.

After the bag has been inserted in the container, and the container and the bag has been moved downwardly, as indicated in Figure 13, air pressure is applied to the stem 38 with the apertures 118 effecting an air blast which blows or folds over the extending portion 117 to approximately the full line position shown in Figure 13. The ram is now elevated, permitting the container and bag to move upwardly into the position illustrated in Figure 14, where the overfolded portion 117 is ironed against the periphery of the container which preferably is precoated with adhesive by the cylindrical bore 114 in the annular member 110, and inasmuch as this member is heated by the coils 111, the folded portion 117 is rigidly secured to the top of the container.

Figure 4:
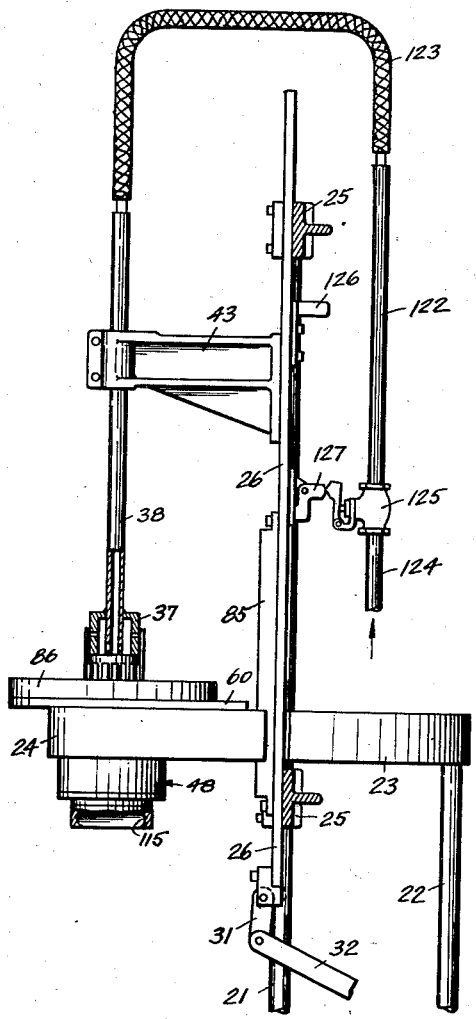
Figure 4 is a view, similar to Figure 3, illustrating the operation of the fluid supply system to the ram.
Figure 5:
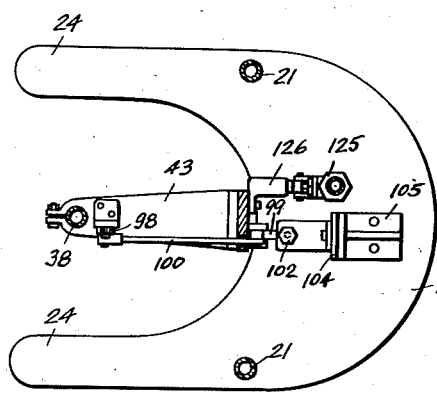
Figure 5 is a plan view of the structures shown in Figures 3 and 4, combined with parts omitted to illustrate the arrangement of the ram actuating mechanism and the air control to the ram.

Referring to Figures 2 and 4, the top of the stem 38 is connected to a conduit 122 by a hose or flexible conduit 123. The conduit 122 is connected to a supply line 124 by means of a valve 125 of the so-called whistle type. The conduits 122, 124 and whistle valve 125 are rigidly secured to the frame in any suitable manner. The slidable bar 2ʳ is provided with a pair of spaced apart rearwardly extending projections 126, 127. The projection 126 is so located relatively that when the ram reaches the bottom of its stroke, with the container positioned as in Figure 13, the valve 125 is open permitting the supply line 124 to be connected with the stem 38, effecting a plurality of radially arranged air blasts against the upwardly extending portion 117 of the bag, as previously described. When the ram has been withdrawn from the die 48 and the apertures 118 in the ram are positioned near the tops of the now vertically arranged fingers 68, the projection 127 operates valve 125 producing another air blast against the upper ends of the fingers 68, forcing them outwardly so that they may swing down to horizontal position so that the succeeding blank may be placed thereon and another bag formed upon successive operation of the ram 37. Preferably, the projection 127 is pivotally mounted upon the bar 26 so that it actuates the valve 125 only on the up stroke.

In Figures 15 to 19, a modified type of ram and pleating structure is shown. In this structure, the folding fingers 39, 40 are omitted from the ram, and the top of the ram is provided with a plurality of radially movable members which serve the double function of folding over the extending portion of the bag and also returning the fingers 68 to their initial horizontal position. In this construction, the ram comprises a sleeve 130 having a comparatively thick side wall. The sleeve 130 is secured to the lower end of a tube 131, and in which is slidably mounted a rod 132. The upper end of the tube 131 is provided with a cylinder 133 connected to a two-way valve 134 by conduit 135. A piston 136 is secured to the upper end of the rod 132, and is normally maintained in upward position by a helical compression spring 137. The upward stroke of the piston 136 and rod 132 is limited by an adjustable stop 139. The lower end of the rod 132 is provided with a transversely extending pin 140 which extends through an elongated slot 141 formed in tube 131, and the outer ends of the pin 140 terminate in a collar 142. The collar 142 is formed at its lower end with a radially extending flange formed with a plurality of radially extending slots 143. Radially movable members 144 are pivoted at their upper ends in slots 143, and their lower inner surfaces 145 are of arcuate formation, and the upper end of the sleeve 130 is provided with complemental arcuate slots. The movable members 144 are encircled by a coil spring 146 which tends to urge said members inwardly about their pivots when the rod 132, piston 136 is in elevated position. When fluid is applied to conduit 135, through valve 134, piston 136 and rod 132 are moved downwardly relative to tube 131, and due to the arcuate surfaces 145 of members 144, and the complemental arcuate slots in the ram, the lower ends of the members 144 are caused to move radially outwardly to contact the upper ends of the fingers 68, or at the bottom of the stroke of the ram to fold over the extending portion of the bag, as illustrated in Figure 15.

The valve 134 may be of the conventional three port, double piston type, with the pistons normally maintained with the exhaust port connected to the conduit 135. Any suitable mechanism may be employed to open and close the valve 134 when the ram has reached predetermined positions. As shown in Figure 15, the valve 134 is secured to the slide bar 26 with the valve stem 148 extending rearwardly, and the support 104 is provided with coacting projections 149, 150. The projection 150 is rigidly mounted on the support 104 and presses the stem 148 inwardly to connect the supply line 151 to the conduit 135. At this time, the ram is at the bottom of its stroke, and the members 144 are actuated to fold over the projecting portion of the bag. The upper projection 149 is preferably pivotally mounted to the support 103 and functions only to press the stem 148 inwardly during upward movement of the ram to actuate the members 144 outwardly into engagement with the upper ends of the fingers 68 which are then in vertical position.

In lieu of the ram being provided with fingers 39 and 40, an annular series of fingers, cooperable with the fingers 68, are carried by the frame of the machine. Referring to Figures 15 and 17, a bracket 160 is secured to the rods 21 and extends forwardly supporting an annular series of bars 161. The forward portion of the bracket 160 is provided with an aperture to permit reciprocation of the ram, and the bars 161 extend downwardly and inwardly toward the axis of the die 48. The bars 161 are spaced intermediate of the fingers 68, and as the fingers 68 are moved toward vertical position, the marginal portion of the blank is formed with radially extending folds in the same manner as when the fingers 68 cooperate with the fingers 39 on the ram structure previously described, see Figure 17.

With this structure, suitable stops 167 may be secured to the vertically slidable rods 95 supporting the confining band 96 for the folding fingers 68. The stops 167 are so arranged on the rods 95 as to position the band 96 so as to encircle the upper ends of the fingers 68 while the ram is descending through the fingers 68, 75, and until the ram returns vertically to a position where the top of the ram has passed by the lower or inner ends of the fingers 68.

The pleating structure is similar to that previously described, except that the rotatable sleeve 76 is not provided with axially extending slots, but is provided adjacent its lower end with a ring 164 of yielding material, such as soft rubber, and the sleeve 76 is actuated by the same mechanism and in the same manner as that described in connection with Figure 7. That is, the bottom of the bag, where the folds merge with the side wall, is frictionally gripped by the rubber ring 164, and as it is rotated, during downward movement of the ram, the folds are formed into pleats through the cooperation of the depending fingers 75.

The annular member 165 secured to the bottom of the die does not include the internal recesses 115 inasmuch as the extending portion of the bag is mechanically folded over by the members 144. The purpose served by the internal recesses 115 in ring 110 is to trap or confine the air so that a positive folding effect will take place.

Referring to Figures 20 to 22, the ram shown is generally of similar construction to that shown in Figures 15 to 19 except that the side wall of the ram is composed of a plurality of radially movable sections 170 which are pivotally secured at their lower ends to the bottom of the ram, and are moved outwardly at their upper ends to form the bag when the same is inserted in a tapered container or cup. The movable sections 170 are provided on their inner sides with inwardly extending projections 171 of hook formation. A helical tension spring 172 is arranged in the hooks 171 and acts to draw the hooks inwardly toward the axis of the ram. The side sections 170 are also provided with inwardly extending projections 173 arranged above the hook projections 171 and being provided with a cam surface 174 and an angular surface 175. The body of the ram is recessed at its periphery to receive the inwardly extending projections 171, 173, and is encircled by a cam sleeve 176 provided with a cam surface complemental to the surface 174. The rod 132 extends downwardly, and a cross pin 180 is secured to the lower end of the rod and extends through an elongated slot 181 formed in the tube 131, and a similar slot 182 formed in the side wall of the ram. The outer ends of the pin 180 terminate in the cam sleeve 176.

From the above description, it will be apparent that at the end of the downward stroke of the ram, downward movement of the rod 132 to actuate the member 144 will also effect outward radial movement of the side sections 170 of the ram, as illustrated in Figure 21. Preferably, the angular surface 175 on the inward projection 173 is such that when the side sections 170 have been expanded to conform with the tapered container, said surface will extend parallel to the axis of the ram so that any additional downward movement of the rod 132 to effect full outward movement of the folding levers 144 will not exert additional radial pressure on the container.

Figure 23:
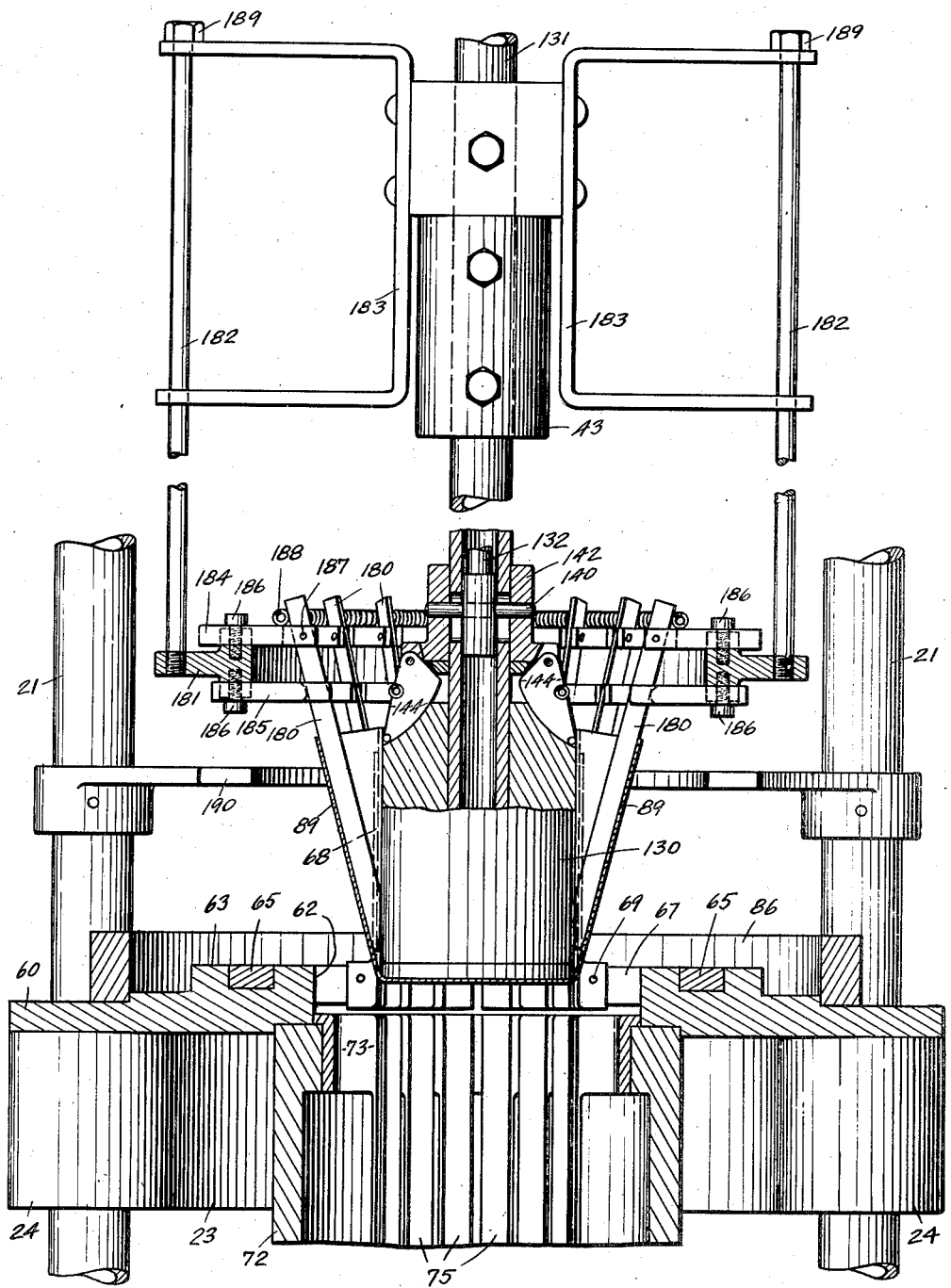
Figure 23 is a view, similar to Figure 17, showing a modified upper folding finger construction.

The construction shown in Figure 23 is generally similar to that shown in Figures 15 and 17, except that the depending fingers 180 are adjustably mounted at their upper ends to an annular member 181 which, in turn, is supported by rods 182 slidably mounted in brackets 183. The brackets 183 are similar to the side members 94, Figures 1 and 16, being secured to the stem 131 and movable therewith and with the ram. The top and bottom edges of the annular member 181 are formed with a series of radially extending slots in which are adjustably mounted upper and lower finger mounts 184, 185, which are secured in adjusted position by cap screws 186. The upper ends of the fingers 180 are pivoted to the upper finger mounts 184, as at 187, and are arranged in slots formed in the inner ends of the lower mounts 185 and are urged about the pivot 187 against the bottom of these slots in the lower mount by a helical compression spring 188 surrounding the upper ends of the fingers 180. The purpose of the adjustable mounting for the fingers 180 is to provide means whereby the proper angle of fold may be obtained for blanks of different sizes.

The upper ends of the rods 182 are provided with heads or nuts 189 which limit the downward movement of the fingers 180 relative to the ram. This position is indicated in Figure 23. As the ram descends toward the pleating mechanism, the annular series of fingers 180 descend with the ram until the annular member 181 rests upon a stop 190 which, as here shown, is secured to the upwardly extending side rods 21 of the frame. Thereafter, the ram continues downwardly through the pleating mechanism, and in the meantime the fingers 68 have coacted with the fingers 180 to form the blank into folds 89 and the stop 190 is positioned so as to locate the lower ends of the fingers 180 at or into the blocks 73. The bag formation is transferred through the pleating mechanism by further movement of the ram which is permitted by the rods 182 sliding through the ends of brackets 183. Upon the return stroke of the ram, the heads 189 of rods 182 coact with the brackets 183, and the finger assembly is elevated together with the ram.

In Figure 23, the ram and the movable fingers 180 are shown with the ram having descended so as to contact the inner ends of the fingers 68 and move them into vertical position. When the ram has reached the top of its stroke, the fingers 180 are elevated above the fingers 68, then in horizontal position, a sufficient distance to permit a feeding of a web or blank of sheet material between the ram fingers 180 and fingers 68.

It will be understood that the confining band 96 may be incorporated with the structure shown in Figure 23, it having been omitted in order to more clearly illustrate the arrangement and mounting of the fingers 180.

It will be readily apparent to those skilled in the art that the machine herein described is particularly adapted to form liner bags from thin sheet material without in any way injuring the material during the formation of the bag. Attention is called to the fact that this machine embodies a distinction from the usual umbrella punch and die mechanism employed for the formation of paper cups and the like. This distinction resides particularly in the fact that the blank is folded into bag formation, rather than being drawn into bag formation, and this folded bag formation is transferred into the pleating mechanism without any appreciable rubbing or frictional contact with the parts of the machine which would injure the film or surface of the material and render it unfit for the purpose for which the bag is being formed. Also, because of this novel construction, the machine can be operated at relatively high speeds without in any way injuring the material during the formation of the bag. It will be further appreciated that the machine is particularly efficient and economical in operation in that the pleated bag is substantially simultaneously inserted in the container and secured thereto without the use of an additional machine, or additional handling of the pleated bag. It will be understood that the preferred embodiment shown and described may be considerably varied without departing from the spirit and scope of my invention.

What I claim is:

1. A machine for forming liner bags from a blank of thin sheet material for containers comprising a suitable frame, a support carried by the frame and being provided with an aperture extending therethrough, a plurality of folding fingers pivotally mounted on one side of said support and extending radially of said aperture and being adapted to support the blank, means for effecting pivotal movement of said fingers, and means cooperable with said fingers during such pivotal movement to arrange the blank in bag formation with the side wall formed with radially extending folds, cooperating members arranged in juxtaposition to said support and adapted to receive the blank in such folded condition and being cooperable independently of the folding means to subsequently form said radial folds into circumferentially extending pleats, and means for drawing the blank through said aperture into said cooperating members.

2. A machine for forming liner bags from a blank of thin sheet material for containers comprising a suitable frame, a support carried by the frame and being provided with an aperture extending therethrough, a ram slidably mounted in the frame and being movable through said aperture to draw the blank therethrough, a plurality of folding fingers pivotally mounted upon one side of said support and extending radially from said aperture and being adapted to support a blank of sheet material, means for effecting pivotal movement of said fingers during axial movement of the ram in said aperture, means cooperable with said fingers during pivotal movement of the same to arrange the blank in bag formation with the side wall thereof formed with radially extending folds, cooperating members arranged coaxially with said aperture on the other side of the support and adapted to receive the blank in such folded condition when the same is drawn through said aperture by the ram, and said members being cooperable independently of said ram to subsequently form said radial folds into circumferentially extending pleats.

3. A machine for forming liner bags from a blank of thin sheet material for containers comprising a suitable frame, a support carried by the frame and being provided with an aperture extending therethrough, a ram slidably mounted in the frame and being movable through said aperture to draw the blank therethrough, a plurality of folding fingers pivotally mounted upon one side of said support and extending radially from said aperture and being adapted to support a blank of sheet material, means for effecting pivotal movement of said fingers during axial movement of the ram in said aperture, means cooperable with said fingers during pivotal movement of the same to arrange the blank in bag formation with the side wall thereof formed with radially extending folds, cooperating members arranged coaxially with said aperture on the other side of the support and adapted to receive the bag formation in such folded condition when the same is drawn through said aperture by the ram, one of said members coacting with the folds of the bag at their bases, and the other of said members coacting with said folds at their extremities, and means for effecting relative rotatable movement between said members to form said folds into pleats.

4. A machine for forming liner bags from a blank of thin sheet material for containers comprising a suitable frame, a support carried by the frame and being provided with an aperture extending therethrough, a ram slidably mounted in the frame and being movable through said aperture to draw the blank therethrough, a plurality of folding fingers pivotally mounted upon one side of said support and extending radially from said aperture and being adapted to support a blank of sheet material, means for effecting pivotal movement of said fingers during axial movement of the ram in said aperture, means cooperable with said fingers during pivotal movement of the same to arrange the blank in bag formation with the side wall thereof formed with radially extending folds, an annular member rotatably mounted on the other side of the support and arranged coaxially of said aperture to receive the folded blank when the same is drawn through said aperture by the ram, a stationary member mounted concentrically between said ram and said annular member and coacting with said folds at their bases, said annular member being cooperable, upon rotation, with said stationary member to form said folds into pleats, and means for effecting rotation of said annular member.

5. A machine for forming liner bags from blanks of thin sheet material for containers comprising a suitable frame, a support carried by the frame and being provided with an aperture extending therethrough, a ram slidably mounted in the frame and being movable through said aperture to draw the blank therethrough, a plurality of folding fingers pivotally mounted upon one side of said support and extending radially from said aperture and being adapted to support a blank of sheet material, means for effecting pivotal movement of said fingers during axial movement of the ram in said aperture, means cooperable with said fingers during pivotal movement of the same to arrange the blank in bag formation with the side wall thereof formed with radially extending folds, an annular member arranged on the opposite side of said support coaxially with said aperture and being formed with internal axially extending grooves arranged in radial formation and being positioned to receive said folds in said grooves as the ram draws the blank through said aperture, stationary means coacting with said folds at their bases, and means operable to effect rotation of said annular member to form said folds into pleats.

6. A machine for forming liner bags from blanks of thin sheet material for containers comprising a suitable frame, a support carried by the frame and being provided with an aperture extending therethrough, a ram slidably mounted in the frame and being movable through said aperture to draw the blank therethrough, a plurality of folding fingers pivotally mounted upon one side of said support and extending radially from said aperture and being adapted to support a blank of sheet material, means for effecting pivotal movement of said fingers during axial movement of the ram in said aperture, means cooperable with said fingers during pivotal movement of the same to arrange the blank in bag formation with the side wall thereof formed with radially extending folds, an annular series of circumferentially spaced apart, axially extending fingers arranged coaxially with said aperture on the other side of said support, and being arranged to receive the bag formation in such folded condition, when the same is drawn through said aperture by the ram, with the folds protruding between said fingers, and means arranged concentrically of said series of fingers and being cooperable, upon rotation, with said series of fingers to form said folds into circumferentially extending pleats.

7. A machine for forming liner bags from blanks of thin sheet material for containers comprising a suitable frame, a support carried by the frame and being provided with an aperture extending therethrough, a plurality of folding fingers pivotally mounted on the top side of said support, said fingers extending radially from said aperture and being adapted to support a blank of sheet material, a ram slidably mounted in the frame in axial alinement with said aperture and movable therein to draw the blank therethrough, said fingers being movable about their pivots upon movement of the ram into said aperture, means cooperable with said fingers during such pivotal movement to arrange the blank in bag formation with the side wall thereof formed with radially extending folds, an annular member formed of resilient material rotatably mounted on the under side of said support and arranged coaxially of said aperture to receive the bag formation as the same is drawn through said aperture, stationary means coacting with said folds at their bases, and means operable to effect rotation of said annular member during axial movement of said bag formation to form said radial folds into circumferentially extending pleats.

8. A machine for forming liner bags from blanks of thin sheet material for containers comprising a suitable frame, a support carried by the frame and being provided with an aperture extending therethrough, a ram slidably mounted in the frame and being movable through said aperture to draw the blank therethrough, a plurality of folding fingers pivotally mounted upon one side of said support and extending radially from said aperture and being adapted to support a blank of sheet material, means for effecting pivotal movement of said fingers during axial movement of the ram in said aperture, means cooperable with said fingers during pivotal movement of the same to arrange the blank in bag formation with the side wall thereof formed with radially extending folds, an annular series of circumferentially spaced apart, axially extending fingers arranged coaxially with said aperture on the other side of said support, and being arranged to receive the bag formation in such folded condition, when the same is drawn through said aperture by the ram, with the folds protruding between said fingers, a sleeve encircling said last mentioned fingers and being formed with internally axially extending grooves arranged in radial formation and being normally positioned with said grooves in radial alinement with the spaces between said fingers to receive said protruding folds of the bag formation, and means operable to effect rotation of said sleeve to form said folds into circumferentially extending pleats.

9. A machine for forming liner bags from blanks of thin sheet material and inserting the same in containers comprising a suitable frame, means carried by the frame for supporting folding mechanism, pleating mechanism, and a container in axial alinement, with the pleating mechanism arranged intermediate said folding mechanism and the container, a ram slidably mounted in said frame and being movable through said folding and pleating mechanism to draw the blank therethrough, said folding and pleating mechanism being successively operable, upon movement of the ram therethrough, to arrange the blank in bag formation with the side wall thereof provided with radially extending folds, and to form said folds into circumferentially extending pleats, and means for operating said ram to press the pleated bag into the container.

10. A machine for forming liner bags from blanks of thin sheet material and inserting the same in containers comprising a suitable frame, a support carried by the frame and being provided with an aperture extending therethrough, a ram slidably mounted in the frame and movable through said aperture, means carried by the frame for positioning and supporting the container below said support in axial alinement with said aperture, a plurality of folding fingers mounted on said support and adapted to support the blank, and means cooperable with said fingers during movement of the ram through said aperture to form the blank into bag formation with the side wall thereof formed with radially extending folds, cooperating pleating members arranged intermediate said support and said container and being cooperable upon movement of the bag formation by said ram through said aperture to form said radial folds into circumferential pleats, and means for actuating said ram to transfer the pleated bag into the container.

11. A machine for forming liner bags from blanks of thin sheet material and inserting the same in containers comprising a suitable frame, a support carried by the frame and being formed with an aperture extending therethrough, a plurality of fingers pivotally mounted on said support and extending radially from said aperture, a ram slidably mounted in the frame in axial alinement with said aperture and being movable therein to draw the blank therethrough, means cooperable with said fingers to preliminarily arrange the blank in bag formation with the side wall thereof formed with radially extending folds, means carried by the frame for positioning and supporting the container below said support in axial alinement with said aperture, cooperating annular members carried by said support and arranged coaxially with said aperture to receive the bag formation and form said folds into circumferentially extending pleats, and means for actuating the ram axially through said aperture and said member to transfer the pleated bag into the container.

12. A machine for forming liner bags from blanks of thin sheet material and inserting the same in containers comprising a suitable frame, means carried by the frame for supporting folding mechanism, pleating mechanism, and a container in axial alinement, with the pleating mechanism arranged intermediate said folding mechanism and the container, a ram slidably mounted in said frame and being movable through said folding and pleating mechanism to draw the blank therethrough, said folding and pleating mechanism being successively operable upon movement of the ram therethrough to arrange the blank in bag formation with the side wall thereof provided with radially extending folds, and to form said folds into circumferentially extending pleats, means for operating said ram to press the pleated bag into the container with the open end of the bag projecting above the top edge of the container, and means operable to subsequently fold said projecting portion of the bag over the top edge of the container.

13. A machine for forming liner bags from blanks of thin sheet material and inserting the same in containers comprising a suitable frame, means carried by the frame for supporting folding mechanism, pleating mechanism, and a container in axial alinement, with the pleating mechanism arranged intermediate said folding mechanism and the container, a ram slidably mounted in said frame and being movable through said folding and pleating mechanism to draw the blank of sheet material therethrough, said folding and pleating mechanism being successively operable upon movement of the ram therethrough to arrange the blank in bag formation with the side wall thereof provided with radially extending folds, and to form said folds into circumferentially extending pleats, means for operating said ram to press the pleated bag into the container with the open end of the bag projecting above the top edge of the container, and means carried by said ram and operable at the end of the stroke to fold said projecting portion of the bag over the top edge of the container.

14. A machine for forming liner bags from blanks of thin sheet material and inserting the same in containers comprising a suitable frame, means carried by the frame for supporting folding mechanism, pleating mechanism, and a container in axial alinement, with the pleating mechanism arranged intermediate said folding mechanism and the container, a ram slidably mounted in said frame and being movable through said folding and pleating mechanism to draw the blank therethrough, said folding and pleating mechanism being successively operable upon movement of the ram therethrough to arrange the blank in bag formation with the side wall thereof provided with radially extending folds, and to form said folds into circumferentially extending pleats, means for operating said ram to press the pleated bag into the container with the open end of the bag projecting over the top edge of the container, means carried by said ram and operable at the end of its stroke to fold said projecting portion of the bag over the top edge of the container, and means for pressing said folded portion against the periphery of the container.

15. A machine for forming liner bags from blanks of thin sheet material and inserting the same in containers comprising a suitable frame, means carried by the frame for supporting folding mechanism, pleating mechanism, and a container in axial alinement, with the pleating mechanism arranged intermediate said folding mechanism and the container, a ram slidably mounted in said frame and being movable through said folding and pleating mechanism to draw the blank therethrough, said folding and pleating mechanism being successively operable upon movement of the ram therethrough to arrange the blank in bag formation with the side wall thereof provided with radially extending folds, and to form said folds into circumferentially extending pleats, means for operating said ram to press the pleated bag into the container with the open end of the bag projecting above the top edge of the container, means carried by said ram and operable at the end of its stroke to fold said projecting portion of the bag over the top edge of the container, and means for pressing said folded portion against the periphery of the container and applying heat thereto.

16. A machine for forming liner bags from blanks of thin sheet material and inserting the same in containers comprising a suitable frame, folding and pleating mechanism carried by the frame and arranged in axial alinement, an annular member carried by the frame, a support carried by the frame for supporting a container coaxially with said folding and pleating mechanism, and with the top edge of the container arranged in said annular member, a ram slidably mounted in the frame in axial alinement with said folding and pleating mechanisms and said container, and being movable to draw the blank through said mechanisms, said folding mechanism being operable to arrange the blank in bag formation with the side wall thereof formed with radially extending folds, and the pleating mechanism being operable to form said folds into circumferentially extending pleats, means for actuating said ram through said mechanisms and said annular member to insert the pleated bag into the container with the open end of the bag projecting upwardly from the top edge of the container, said support and container being movable from said annular member upon insertion of the bag in the container, and means carried by the ram and operable to fold the open end of the bag over the top edge of the container when the same is positioned in such spaced apart relationship to said annular member, and said support and container being movable toward said annular member upon the return stroke of the ram to press the open end of the container and the folded end of the bag into said annular member.

17. A machine for forming liner bags from blanks of thin sheet material and inserting the same in containers comprising a suitable frame, folding and pleating mechanism carried by the frame, an annular member arranged coaxially of said folding and pleating mechanism, a container support arranged to position a container with the open end thereof in said annular member, said annular member being formed with an internal circular recess, and said support being movable in a direction from said folding and pleating mechanism to position the open end of the container in said recess, a ram slidably mounted in the frame and being operable to draw the blank through said pleating and folding mechanism, and said mechanism being operable during such movement of the ram to arrange the blank in the form of a pleated bag, said ram being also operable to transfer the pleated bag through said annular member and insert the same into the container with the open end of the bag projecting above the top of the container and to subsequently effect movement of the container support and container to position the top of the container and extending portion of the bag in said circular recess, and means for producing an air blast against the inner surface of said extending portion of the bag to fold the same over the top edge of the container.

18. A machine for forming liner bags from a blank of thin sheet material and inserting the same in containers comprising a suitable frame, means carried by the frame for supporting folding mechanism, pleating mechanism, and a container in axial alinement, with the pleating mechanism arranged intermediate said folding mechanism and the container, a ram slidably mounted in said frame and being movable through said folding and pleating mechanism to draw the blank therethrough, said folding and pleating mechanism being successively operable upon movement of the ram therethrough to arrange the blank in bag formation with the side wall thereof provided with radially extending folds, and to form said folds into circumferentially extending pleats, means for operating said ram to press the pleated bag into the container with the open end of the bag projecting above the top edge of the container, a plurality of radially movable members carried by said ram, and means for actuating said members radially outwardly to fold the projecting portion of the bag over the top edge of the container.

19. A machine for forming liner bags from a blank of thin sheet material for containers comprising a suitable frame, a support carried by the frame and being provided with an aperture extending therethrough, a plurality of folding fingers movably mounted upon said support and extending radially from said aperture and being adapted to support the blank when in horizontal position, a ram slidably mounted in the frame and movable into and out of said aperture, means operable to move said fingers to vertical position during axial movement of the ram through said aperture, means cooperable with said fingers during movement of the same to arrange the blank in bag formation with the side wall thereof formed with radially extending folds, cooperating members arranged beneath said aperture and adapted to receive the blank in such folded condition and being cooperable to subsequently form said radial folds into circumferentially extending pleats, means cooperable with the outer ends of said fingers for maintaining the same in vertical position until after the ram has been withdrawn from said aperture, and means for actuating said ram.

20. A machine for forming liner bags from a blank of thin sheet material for containers comprising a suitable frame, a support carried by the frame and being provided with an aperture extending therethrough, a plurality of folding fingers movably mounted upon said support and extending radially from said aperture and being adapted to support the blank when in horizontal position, a ram slidably mounted in the frame and movable into and out of said aperture, means operable to move said fingers to vertical position during axial movement of the ram through said aperture, means cooperable with said fingers during movement of the same to arrange the blank in bag formation with the side wall thereof formed with radially extending folds, cooperating members arranged beneath said aperture and adapted to receive the blank in such folded condition and being cooperable to subsequently form said radial folds into circumferentially extending pleats, means for maintaining said fingers in vertical position until after the ram has been withdrawn from said aperture, means carried by the ram and operable subsequently to actuate said fingers to horizontal position, and means for actuating said ram.

21. A machine for forming liner bags from a blank of thin sheet material for containers comprising a suitable frame, a support carried by the frame and being provided with an aperture extending therethrough, a plurality of folding fingers movably mounted upon said support and extending radially from said aperture and being adapted to support the blank when in horizontal position, a ram slidably mounted in the frame and movable into and out of said aperture, means operable to move said fingers to vertical position during axial movement of the ram through said aperture, means cooperable with said fingers during movement of the same to arrange the blank in bag formation with the side wall thereof formed with radially extending folds, cooperating members arranged beneath said aperture and adapted to receive the blank in such folded condition and being cooperable to subsequently form said radial folds into circumferentially extending pleats, means for maintaining said fingers in vertical position until after the ram has been withdrawn from said aperture, and means associated with said ram and operable to effect an air blast against the outer ends of said fingers to return them to horizontal position.

22. A machine for forming liner bags from a blank of thin sheet material for containers comprising a suitable frame, a support carried by the frame and being provided with an aperture extending therethrough, a plurality of folding fingers movably mounted upon said support and extending radially from said aperture and being adapted to support the blank when in horizontal position, a ram slidably mounted in the frame and movable into and out of said aperture, means operable to move said fingers to vertical position during axial movement of the ram through said aperture, means cooperable with said fingers during movement of the same to arrange the blank in bag formation with the side wall thereof formed with radially extending folds, cooperating members arranged beneath said aperture and adapted to receive the blank in such folded condition and being cooperable to subsequently form said radial folds into circumferentially extending pleats, means for maintaining said fingers in vertical position until after the ram has been withdrawn from said aperture, a plurality of radially movable members carried by said ram and arranged to contact said fingers during outward radial movement, means for effecting outward radial movement of said members upon movement of said ram out of said aperture.

23. A machine for forming liner bags from blanks of thin sheet material for containers comprising a suitable frame, a support carried by the frame and being provided with an aperture extending therethrough, a second support, a plurality of fingers carried by said second support and extending toward said first support and being arranged coaxially with said aperture therein, a series of fingers pivotally mounted on said first support and extending radially from said aperture, said last mentioned fingers being cooperable, during pivotal movement, with said first mentioned fingers to arrange the blank in bag formation with the side wall thereof formed with radially extending folds, a ram slidably mounted in the frame and movable relative to said first mentioned fingers into and out of said aperture to draw the blank therein, and means for effecting pivotal movement of said fingers carried by the first mentioned support during movement of the ram into said aperture.

24. A machine for forming liner bags from blanks of thin sheet material for containers comprising a suitable frame, a support carried by the frame and being provided with an aperture extending therethrough, a ram slidably mounted in the frame and being movable into and out of said aperture to draw the blank therein, an annular series of fingers supported by the frame independently of the ram and arranged coaxially with said ram and extending downwardly toward said support, a plurality of folding fingers pivotally mounted on said support and being cooperable during pivotal movement with said first mentioned fingers to preliminarily form the marginal portion of said blank into folds during movement of said ram into said aperture.

25. A machine for forming liner bags from blanks of thin sheet material for containers comprising a suitable frame, a support carried by the frame and being provided with an aperture extending therethrough, a ram slidably mounted in the frame and movable into and out of said aperture to draw the blank therein to arrange the same in bag formation, an annular series of fingers supported at their upper ends by the frame coaxially with said ram and extending toward said support and converging toward the axis of said aperture, a plurality of fingers pivotally mounted upon said support and extending radially from said aperture and being cooperable, upon pivotal movement of said first mentioned fingers, to form the marginal portion of the blank into radially extending folds upon movement of the ram into said aperture.

26. A machine for forming liner bags from blanks of thin sheet material and inserting the same in containers comprising a suitable frame, a support carried by the frame and being formed with an aperture extending therethrough, a ram slidably mounted in the frame and movable into and out of said aperture, a plurality of folding fingers pivotally mounted on said support and extending radially from said aperture, and being cooperable with said ram upon movement of the same through said aperture to arrange the blank in bag formation with the side wall of the bag formed with radially extending folds, pleating mechanism arranged in axial alinement with said aperture and being operable upon movement of the bag formation through said pleating mechanism by said ram to subsequently form said folds into circumferentially extending pleats, a second support carried by the frame for positioning and supporting a container below said pleating mechanism to receive the pleated bag as the ram moves through said aperture and pleating mechanism, said ram being provided with a plurality of expansible side members, and means operable to expand said members radially to press the bag into engagement with the interior of the container.

27. A machine for forming liner bags from blanks of thin sheet material and inserting the same in containers comprising a suitable frame, a support carried by the frame and being formed with an aperture extending therethrough, a ram slidably mounted in the frame and movable into and out of said aperture, a plurality of folding fingers pivotally mounted on said support and extending radially from said aperture, and being cooperable with said ram upon movement of the same through said aperture to arrange the blank in bag formation with the side wall of the bag formed with radially extending folds, pleating mechanism arranged in axial alinement with said aperture and being operable to subsequently form said folds into circumferentially extending pleats, a second support carried by the frame for positioning and supporting a container below said pleating mechanism to receive the pleated bag as the ram moves through said aperture and pleating mechanism, means for actuating said ram through said aperture and pleating mechanism to insert the bag in the container with the open end of the bag extending above the top edge of the container, said ram being provided with radially movable side members, means operable to move said members outwardly to press the bag into engagement with the interior of the container, and means carried by the ram and operable to subsequently fold the extending portion of the bag over the top edge of the container.

28. A machine for forming liner bags from blanks of thin sheet material and inserting the same in containers comprising a suitable frame, a support carried by the frame and being formed with an aperture extending therethrough, a ram slidably mounted in the frame and movable into and out of said aperture, a plurality of folding fingers pivotally mounted on said support and extending radially from said aperture, and being cooperable with said ram upon movement of the same through said aperture to arrange the blank in bag formation with the side wall of the bag formed with radially extending folds, pleating mechanism arranged in axial alinement with said aperture and being operable to subsequently form said folds into circumferentially extending pleats, a second support carried by the frame for positioning and supporting a container below said pleating mechanism to receive the pleated bag as the ram moves through said aperture and pleating mechanism, said ram being provided with a plurality of expansible side members pivoted at the lower end of the ram and being movable radially outwardly at their upper ends, and means operable to move the upper ends of said members radially outwardly to press the bag into engagement with the interior of the container.

29. A machine for forming liner bags from blanks of thin sheet material and inserting the same in containers, said machine comprising a suitable frame, a support carried by the frame and being formed with an aperture extending therethrough, a ram slidably mounted in the frame and movable through said aperture, means carried by said support and being cooperable with said ram to arrange the blank in bag formation, pleating mechanism arranged in axial alinement with said aperture and being operable to form the side wall of the bag with circumferentially extending pleats, a second support carried by the frame and being movable toward and from said pleating mechanism and adapted to position a container in axial alinement with said pleating mechanism, means for maintaining said support with the top edge of the container arranged in said pleating mechanism, means for actuating said ram to transfer the pleated bag into the container with the open end of the bag extending beyond the top edge of the container and to move said support and container from said pleating mechanism, and means carried by the ram and operable to fold the extending portion of the bag over the top edge of the container.

30. A machine for forming liner bags from blanks of thin sheet material and inserting the same in containers comprising a suitable frame, folding mechanism and pleating mechanism carried by the frame and arranged in axial alinement, a container support carried by the frame for positioning and supporting a container in axial alinement with said folding and pleating mechanisms, a ram slidably mounted in the frame and being operable to transfer the blank successively through the folding and pleating mechanism and inserting the folded and pleated bag into the container, and means operable to retain said bag in the container during the return movement of said ram.

31. A machine for forming liner bags from a blank of thin sheet material for containers comprising a suitable frame, folding mechanism and pleating mechanism mounted on said frame in axial alinement, a ram slidably mounted in said frame and being movable through said folding and pleating mechanism, said folding mechanism comprising a support provided with an aperture extending therethrough, a plurality of folding fingers movably mounted upon said support and extending radially from said aperture and being adapted to support the blank when in horizontal position, means operable to move said fingers to vertical position during axial movement of the ram through said aperture, and means cooperable with said fingers during movement of the same to arrange the blank in bag formation with the side wall thereof formed with radially extending folds, said pleating mechanism comprising co-operating members adapted to receive the blank in such folded condition and being cooperable to subsequently form said radial folds in circumferentially extending pleats, means for maintaining said fingers in vertical position until after the ram has been withdrawn from said pleating and folding mechanism, and means for actuating said ram.

32. A machine for forming liner bags from a blank of thin sheet material comprising a suitable frame, a support carried by the frame and being provided with an aperture, a plurality of folding fingers pivotally mounted on said support and extending radially from said aperture, a ram slidably mounted in the frame and movable into and out of said aperture to draw the blank therethrough, means operable to move said fingers to vertical position during axial movement of the ram in said aperture and said fingers and ram being cooperable during such movement to arrange the blank in bag formation with the side wall thereof formed with radially extending folds, means for actuating said ram, and means operable during movement of said ram in said aperture to encircle the upper ends of said fingers and maintain the fingers in vertical position during the return movement of said ram out of said aperture.

33. A machine for forming liner bags for containers from a blank of thin sheet material comprising a suitable frame, a support carried by the frame and being provided with an aperture, a plurality of folding fingers pivotally mounted on said support and extending radially from said aperture, a second support carried by the frame, an annular series of fingers depending from said second support and extending toward said first mentioned fingers, a ram slidably mounted in the frame and being movable axially through both groups of fingers and into and out of said aperture, means operable to move said first mentioned fingers to vertical position during axial movement of the ram in said aperture and both groups of fingers being cooperable during such movement of the ram to arrange the blank in bag formation, means for actuating said ram and means operable during movement of said ram in said aperture to encircle the upper ends of said first mentioned fingers and maintain the same in vertical position during the return movement of said ram from said aperture.

34. A machine for forming liner bags from a blank of thin sheet material for containers comprising a suitable frame, a support carried by the frame provided with an aperture extending therethrough, a plurality of folding fingers movably mounted upon said support and extending radially from said aperture and being adapted to support the blank when in horizontal position, a ram slidably mounted in the frame and movable through said aperture and being cooperable with said fingers to move the same into vertical position and during such movement to arrange the blank in bag formation with the side wall thereof formed with radially extending folds, an annular member encircling said ram in spaced apart relationship thereto and being carried by a support slidably mounted in the frame, said last mentioned support being cooperable with said ram upon movement of the same through said aperture to position said annular member about the ends of said fingers when the same are in vertical position to retain said fingers in vertical position, and said annular member support being cooperable with said ram upon return movement of the same through said fingers to move said annular member out of such retaining position, and means for actuating said ram.

35. A machine for forming liner bags for containers from a blank of thin sheet material comprising a suitable frame, a support carried by the frame and being provided with a central aperture, a plurality of fingers movably mounted on said support and extending radially from said aperture, a ram slidably mounted in the frame and being movable through said aperture to draw the blank therethrough, said ram being provided with a plurality of normally radially disposed fingers pivotally secured at their inner ends to the lower end of said ram and being movable about said pivots toward said ram, the fingers carried by said support and the fingers carried by said ram being cooperable during axial movement of the ram into said aperture to arrange the blank in bag formation with the side wall thereof formed with radially extending folds, cooperating pleating members arranged coaxially with said aperture on the other side of said support and adapted to receive the bag formation in such folded condition when the same is drawn through said aperture by the ram, said members being cooperable to form said radial folds into circumferentially extending pleats, and means carried by the ram and operable to move said fingers within said ram during operation of said pleating members.

36. A machine for forming liner bags for containers from blanks of thin sheet material comprising a suitable frame, a support carried by the frame and being provided with a central aperture, a plurality of fingers pivotally mounted on said support and extending radially from said aperture and adapted to support a blank when in horizontal position, a ram slidably mounted in the frame and movable through said aperture to draw the blank therethrough, means operable during axial movement of the ram in said aperture to effect movement of said fingers about their pivots into vertical position, means cooperable with said fingers during such pivotal movement to arrange the blank in bag formation with the side wall thereof formed with radially extending folds, and means operable to effect a discharge of air radially from said ram upon return movement of the same to effect return movement of said fingers to horizontal position.

37. A machine for forming liner bags for containers from blanks of thin sheet material comprising a suitable frame, a support carried by the frame and being provided with a central aperture, a plurality of fingers pivotally mounted on said support and extending radially from said aperture and adapted to support a blank when in horizontal position, a ram slidably mounted in the frame and movable through said aperture to draw the blank therethrough, means operable during axial movement of the ram in said aperture to effect movement of said fingers about their pivots into vertical position, means cooperable with said fingers during such pivotal movement to arrange the blank in bag formation with the side wall thereof formed with radially extending folds, movable members carried by said ram and means operable to move said members radially outwardly to engage said fingers and move the same to horizontal position upon return movement of said ram from the aperture.

38. A machine for forming liner bags for containers from blanks of thin sheet material and inserting the same in the containers comprising a suitable frame, means carried by the frame for supporting folding mechanism, pleating mechanism and yieldingly supporting the container, all in axial alinement, the pleating mechanism being arranged intermediate said folding mechanism and the container, a ram slidably mounted in the frame and being movable through said folding and pleating mechanism to draw the blank therethrough, and said folding and pleating mechanisms being successively operable upon movement of the ram therethrough to arrange the blank in bag formation with the side wall thereof provided with radially extending folds, and to form said folds into circumferentially extending pleats, and said ram being operable to subsequently press the pleated bag into the container.

39. A machine for forming liner bags from blanks of thin sheet material comprising a suitable frame, a support carried by the frame and being provided with an aperture extending therethrough, a ram slidably mounted in the frame and being movable into and out of said aperture to draw the blank therein, an annular member arranged concentrically of said ram, means for supporting said member and operable to effect limited movement of the same toward and from said support upon axial movement of the ram into and out of said aperture, an annular series of fingers carried by said annular member and extending downwardly toward said support, a second series of fingers pivotally mounted on said support and extending radially from said aperture and being cooperable, upon pivotal movement, with said annular series of fingers to form the marginal portion of the blank with radially extending folds during movement of the ram into said aperture.

40. A machine for forming liner bags from blanks of thin sheet material comprising a suitable frame, a support carried by the frame and being provided with an aperture extending therethrough, a ram slidably mounted in the frame and being movable into and out of said aperture to draw the blank therein, an annular member arranged concentrically of said ram, means for supporting said member and operable to effect limited movement of the same toward and from said support upon axial movement of the ram into and out of said aperture, an annular series of fingers carried by said annular member and extending downwardly toward said support and in angular relation to the axis of said ram, means operable to adjust the angularity of said fingers, a second series of fingers pivotally mounted on said support and extending radially from said aperture and being cooperable, upon pivotal movement, with said annular series of fingers to form the marginal portion of the blank with radially extending folds during movement of the ram into said aperture.

ISAAC L. WILCOX.